(12) United States Patent
Jansen

(10) Patent No.: US 7,021,978 B2
(45) Date of Patent: Apr. 4, 2006

(54) HUMAN-POWERED GENERATOR SYSTEM WITH ACTIVE INERTIA AND SIMULATED VEHICLE

(76) Inventor: Patrick Lee Jansen, 1539 Washout Rd., Scotia, NY (US) 12302

(*) Notice: Subject to any disclaimer, the term of this patent is extended or adjusted under 35 U.S.C. 154(b) by 52 days.

(21) Appl. No.: 11/053,035

(22) Filed: Feb. 8, 2005

(65) Prior Publication Data

US 2005/0208845 A1    Sep. 22, 2005

Related U.S. Application Data

(60) Provisional application No. 60/543,089, filed on Feb. 9, 2004.

(51) Int. Cl.
*B60L 11/02*    (2006.01)

(52) U.S. Cl. .................. 440/6; 440/27; 180/220; 280/212

(58) Field of Classification Search .............. 440/3, 440/6, 21, 26–31; 180/220, 221; 280/212, 280/215, 216
See application file for complete search history.

(56) References Cited

U.S. PATENT DOCUMENTS

| | | | | |
|---|---|---|---|---|
| 5,316,101 A | * | 5/1994 | Gannon | 180/220 |
| 5,489,002 A | * | 2/1996 | Streiff | 180/220 |
| 6,217,398 B1 | * | 4/2001 | Davis | 440/21 |
| 6,855,016 B1 | * | 2/2005 | Jansen | 440/6 |

* cited by examiner

*Primary Examiner*—Lars A. Olson

(57) ABSTRACT

A human-powered generator system for electric watercycles with a control means whereby the perceived mechanical properties of the pedal mechanism and electric pedal-powered generator are adjustable by the operator. The invention provides a means whereby the rotational inertia and damping of the input pedal mechanism, including generator, as perceived by the operator can be increased or decreased as desired. The control means with further properties such that the input pedal mechanism as perceived by the operator can be made to mimic that of bicycle; i.e., with large inertia when pedaling in the forward direction, a very low inertia when pedaling in the reverse direction, and a freewheeling clutch mechanism whereby the large inertia is disengaged when not pedaling in the forward direction with a forward torque. The control means further enable the electric watercycle to be perceived as coasting through the water when the operator takes a momentary break from pedaling, much like that of a bicycle coasting.

20 Claims, 14 Drawing Sheets

HUMAN-POWERED GENERATOR SYSTEM WITH ACTIVE INERTIA AND SIMULATED VEHICLE

This application claims benefit of Provisional Application No. 60/543,089 filed Feb. 9, 2004.

FEDERALLY SPONSORED RESEARCH

Not Applicable

SEQUENCE LISTING OR PROGRAM

Not Applicable

BACKGROUND

1. Field of Invention

The present invention relates to the general art of watercraft, and to the particular field of control means for hybrid-electric powered watercraft incorporating manual (pedal, human) power with electric power amplification.

2. Description of Prior Art

A multitude of pedal-powered watercraft (also referred to as water bikes, water-bicycles, and watercycles) are commercially available. They are relatively low cost, low maintenance, light weight, and fun. Their main drawback is the relatively low power output capability of the operators. Unlike watercraft propelled by conventional combustion engines, pedal-powered watercraft are severely limited in power capability; typically less than 200 watts (around ¼ hp) per person on a continuous basis. A cyclist in good condition can generate around 200 watts at a preferred cadence of around 90–100 RPM. Many people of lesser abilities may be only capable of generating around 100 watts in a continuous comfortable manner. Thus maximizing the overall efficiency of the watercraft, including its propulsion system, as it travels in water is vitally important to maximize speed and travel distance capabilities. To maximize the speed (and pedaling efficiency), many of the newer watercycles such as the Seacycle® and Waterbike® manufactured by the Meyers Boat Company, Inc., are designed to be lightweight with efficient long and narrow hulls.

U.S. Pat. No. 6,855,016 (Jansen) discloses an electric watercycle incorporating electrical power generation from human kinetic power, and electrical energy storage to enable amplification of human-power to propulsion power to achieve increased watercraft speeds. Control electronics enable operator-adjustable variable electronic gearing, and an assortment of torque vs. speed loading characteristics of the generator, thereby providing optimal pedal cadences and enjoyment for a wide variety of operators. An optional photovoltaic solar panel augments the power generation to extend travel time with power amplification, and recharges the energy storage system. This invention provides a pleasure watercraft that is simultaneously lightweight, low cost, low maintenance, environmentally friendly with zero pollution, ultra-low noise, and thrilling to operate, while simultaneously providing a means of enjoyable exercise for operators of nearly all abilities.

One additional drawback of the existing watercycles, including the electrical watercycle, is that the mechanical properties such as rotational inertia as perceived by the operator at the input pedal mechanism is unlike that of bicycles. The pedaling effort is often felt to be jerky and not nearly as enjoyable as pedaling a bicycle. Two of the main causes of this are a reduced rotational inertia, and a lack of a freewheeling clutch mechanism, in most watercycles of the prior art.

U.S. Pat. No. 6,217,398 B1 (Davis) discloses a human-powered or human-assisted energy generation and transmission system with energy storage means and improved efficiency. The generation and transmission system is intended to be an improvement over conventional mechanical systems, such as pedal-powered systems comprising chains and sprockets, by controlling the energy output to be constant, independent of the pedal position, thereby claiming to improve the overall efficiency. Over a typical pedal cycle, the power produced by a human varies substantially with pedal position. According to the Davis invention, energy storage is used to supplement the human power during the portion of the pedaling cycle that is least efficient. This portion of the pedal cycle is determined by sensors detecting the pedal position during rotation. The supplemental energy is extracted from the energy generated during the portion of the pedaling cycle that is most efficient, such that the average energy generated and used for propulsion is not increased, apart from potential claimed efficiency improvements. The generation and transmission system consists of electric generators, motors, energy storage, controllers, and sensors, without mechanical linkages. The intended applications are human-powered or human-assisted vehicles of all types, including bicycles, watercraft, aircraft, hydrofoils, and hovercraft.

Objects and Advantages

The object of the invention is to make watercycles, and in particular, electric watercycles, more enjoyable to pedal for the operators, and to increase the overall enjoyment of operating electric watercycles. This invention fulfills this objective by providing a control means whereby the perceived mechanical properties of the pedal mechanism and electric pedal-powered generator are adjustable by the operator. The invention provides a means whereby the rotational inertia and damping of the input pedal mechanism, including generator, as perceived by the operator can be increased or decreased as desired.

A further object of this invention is to provide a means whereby the properties of the input pedal mechanism as perceived by the operator can be made to mimic that of bicycle; i.e., with large inertia when pedaling in the forward direction, a very low inertia when pedaling in the reverse direction, and a freewheeling clutch mechanism whereby the large inertia is disengaged when not pedaling in the forward direction with a forward torque.

Another objective of the invention is to provide a means whereby the electric watercycle is perceived to coast through the water when the operator takes a momentary break from pedaling. This effect is to mimic that of a bicycle coasting either on a flat or hilly terrain. Likewise, the invention provides a means whereby the watercycle can be perceived to coast on flat terrain, or even down a hill. In the prior art, a watercycle would come to a relatively quick stop when the operator stops pedaling due to the drag of the water on the watercraft hull. With this invention, the watercycle continues moving through the water as if coasting and comes to a slower stop when the operator stops pedaling.

Another objective of this invention is to provide a means whereby rapid stopping and reversing of the watercycle is possible by pedaling in the reverse direction.

The invention provides these above objectives solely through the use of special control means of the electric generator and associated control electronics of the electric watercycle.

SUMMARY

The present invention improves upon a hybrid electric watercraft for personal enjoyment that incorporates human power with electric battery storage and solar power in innovative new methods. This invention allows the operator to tailor the perceived mechanical characteristics of the input mechanism. Specifically, this invention enables the operator to adjust the effective inertia and damping through control means to increase the operating pleasure. Furthermore, through active inertia and damping control, combined with a simulated vehicle internal to the controls, the operating characteristics of the electric watercycle can be made to be similar to that of a bicycle with the desirable features of large inertia when pedaling forward to accelerate and coasting when not pedaling.

DRAWINGS

Drawing Figures

Figure 6:
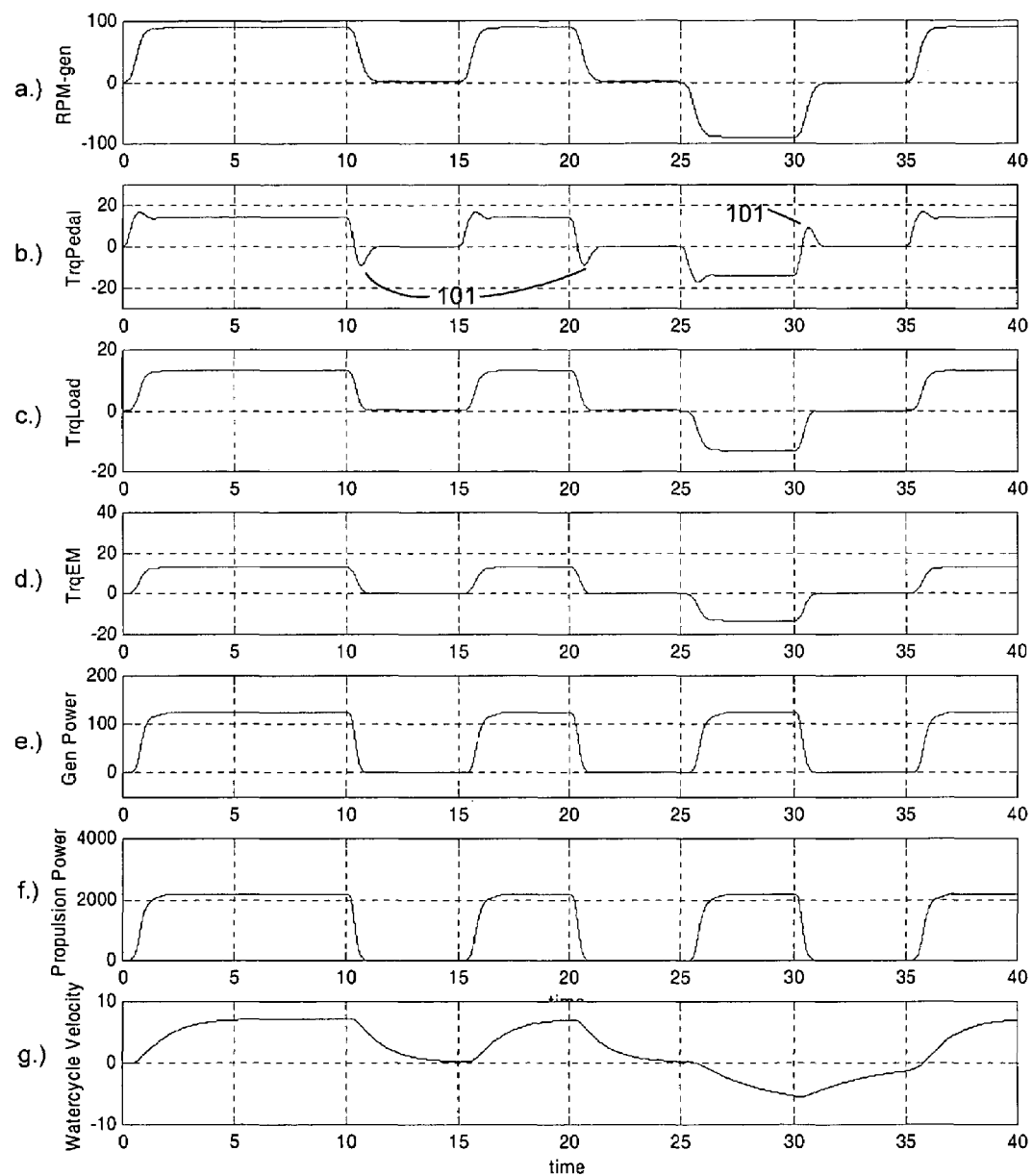

FIG. 6 provides waveforms illustrating the operating characteristics of the controller for the pedal generator of the prior art.

Figure 7:
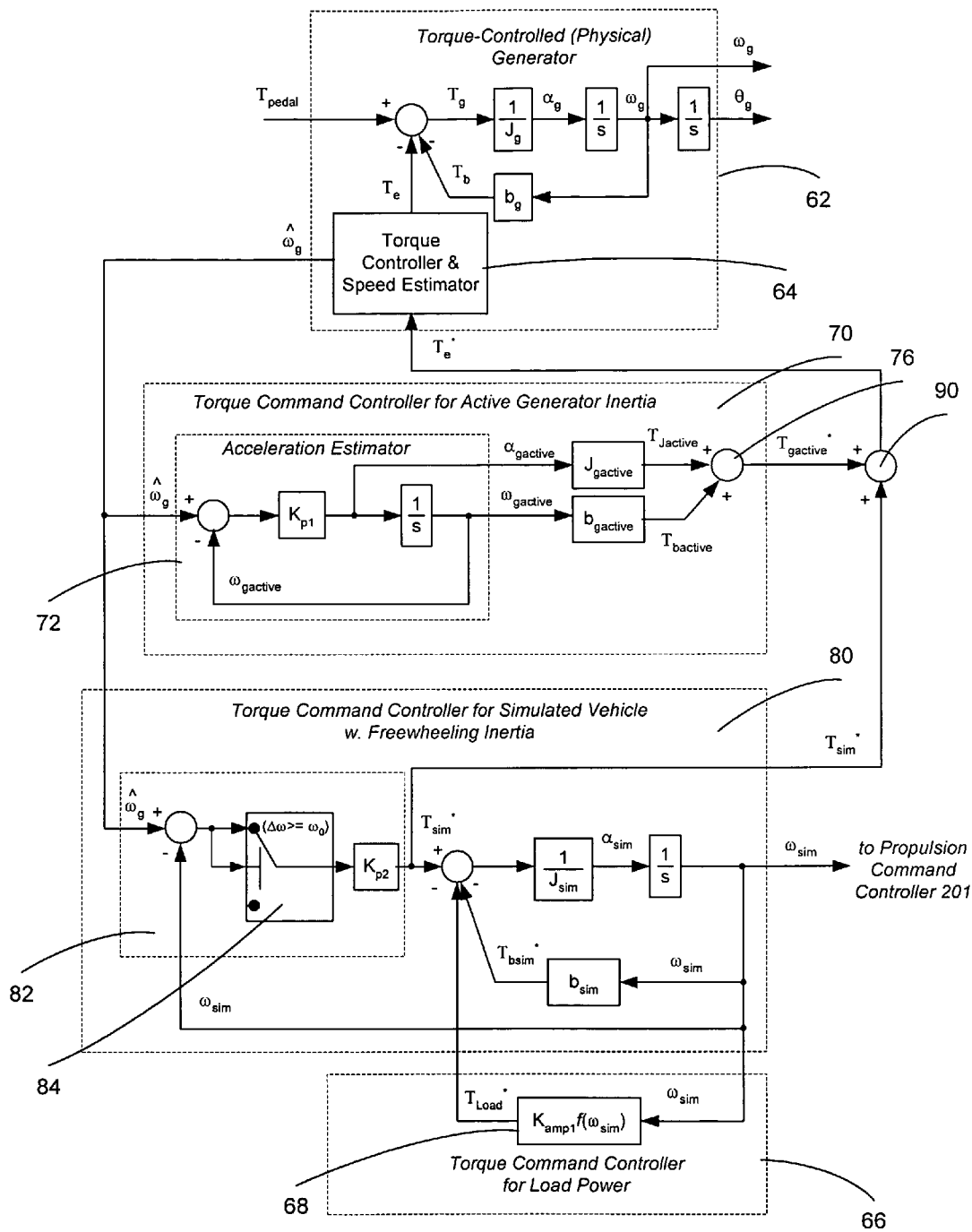

FIG. 7 is a block diagram illustrating the controller for the pedal (human-powered) generator with the simulated (active) inertia and simulated vehicle with freewheeling clutch mechanism of the invention mimicking that of a bicycle and its pedal mechanism.

Figure 8:
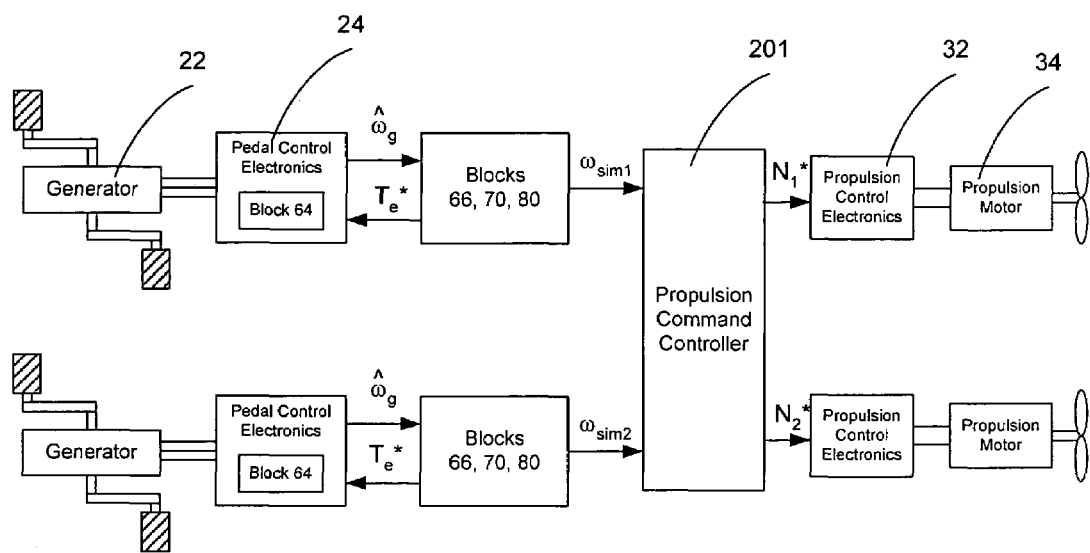

FIG. 8 is a block diagram illustrating the control signals passing between the various controller blocks.

FIG. 9 provides waveforms illustrating the operating characteristics of the controller for the pedal (human-powered) generator with the simulated (active) inertia and simulated vehicle with freewheeling clutch mechanism of the invention mimicking that of a bicycle and its pedal mechanism.

Figure 10:
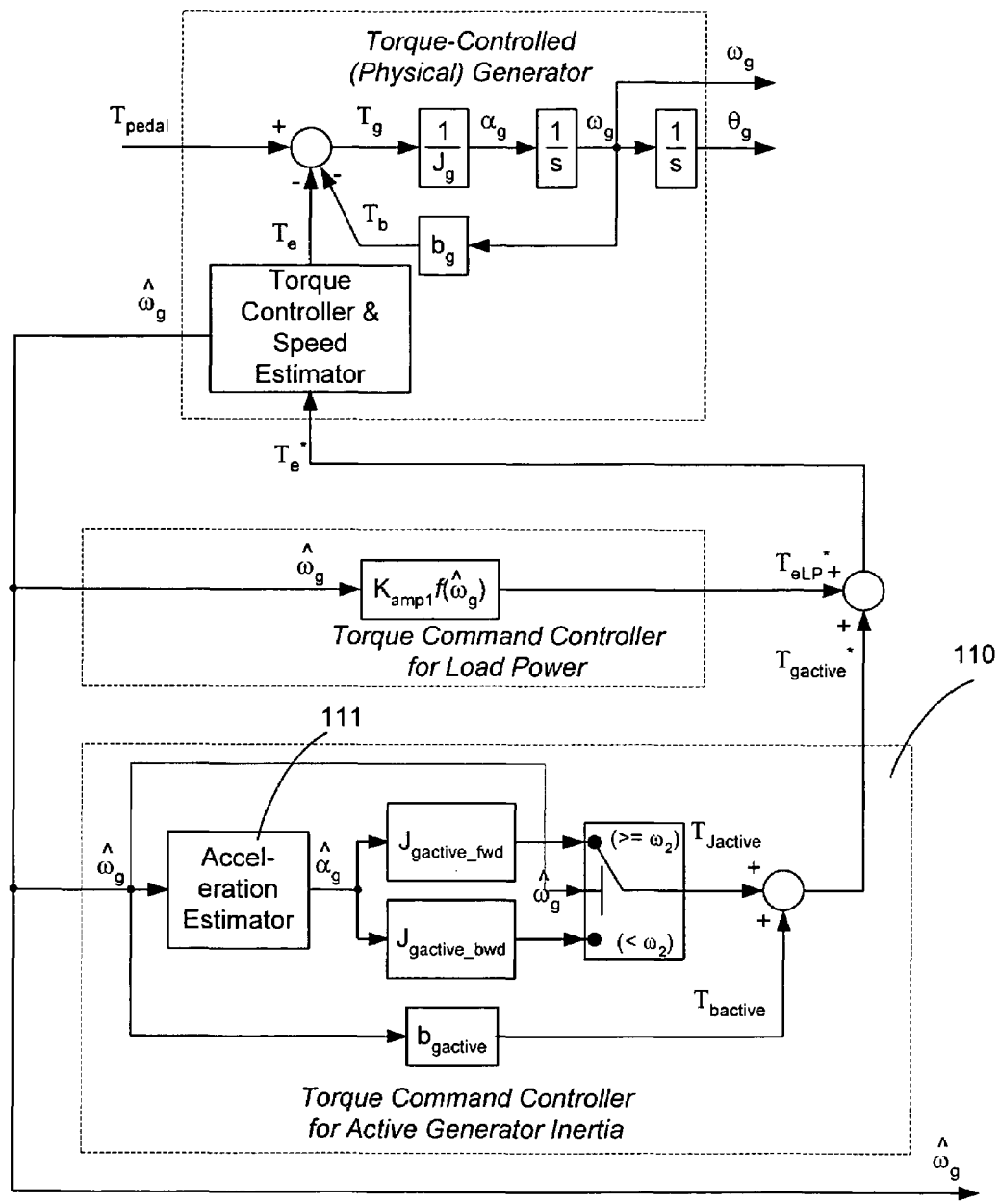

FIG. 10 is a block diagram illustrating an alternative embodiment of the controller with active generator inertia.

Figure 11:
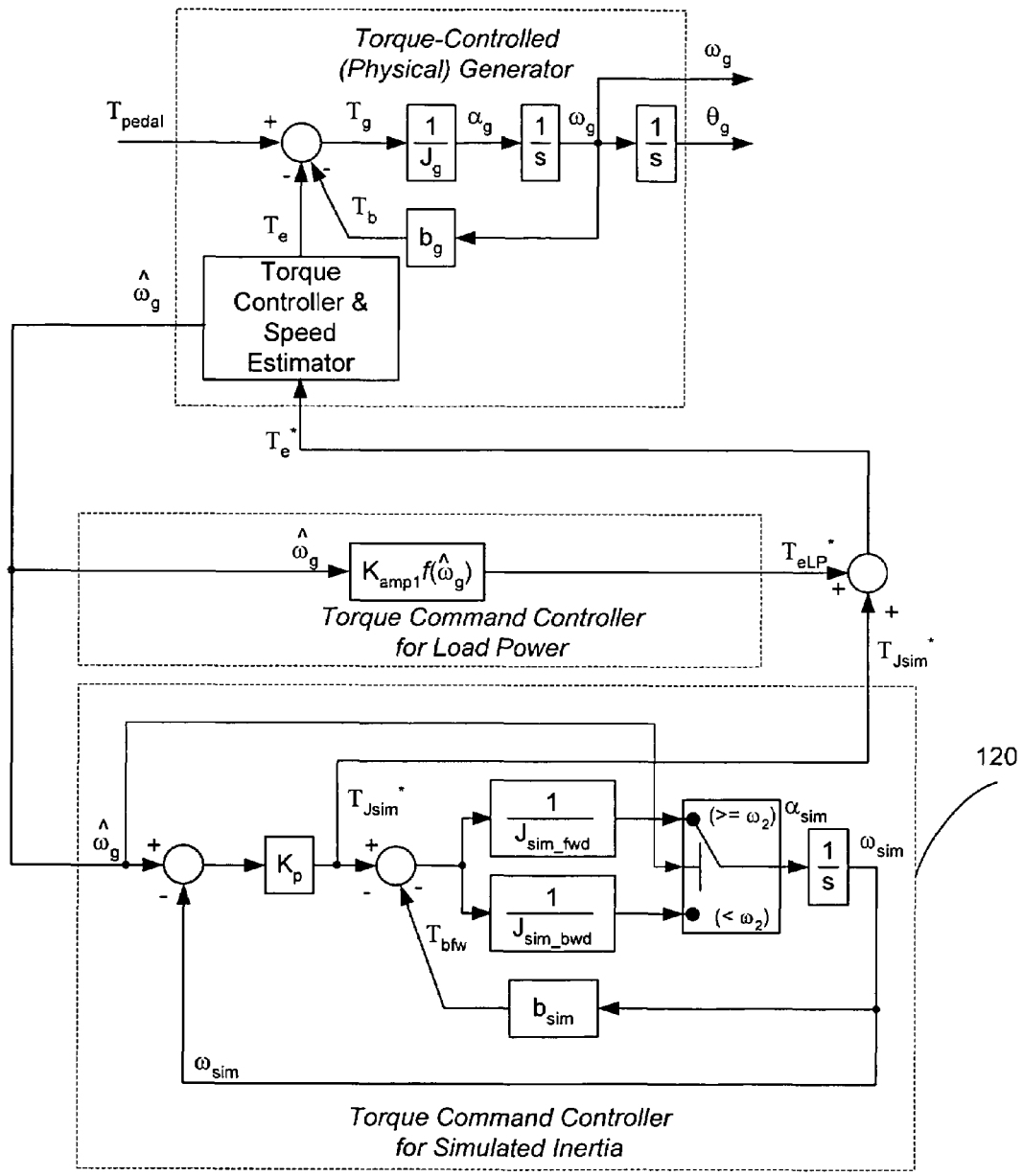

FIG. 11 is a block diagram illustrating an alternative embodiment of the controller with simulated inertia.

Figure 12:
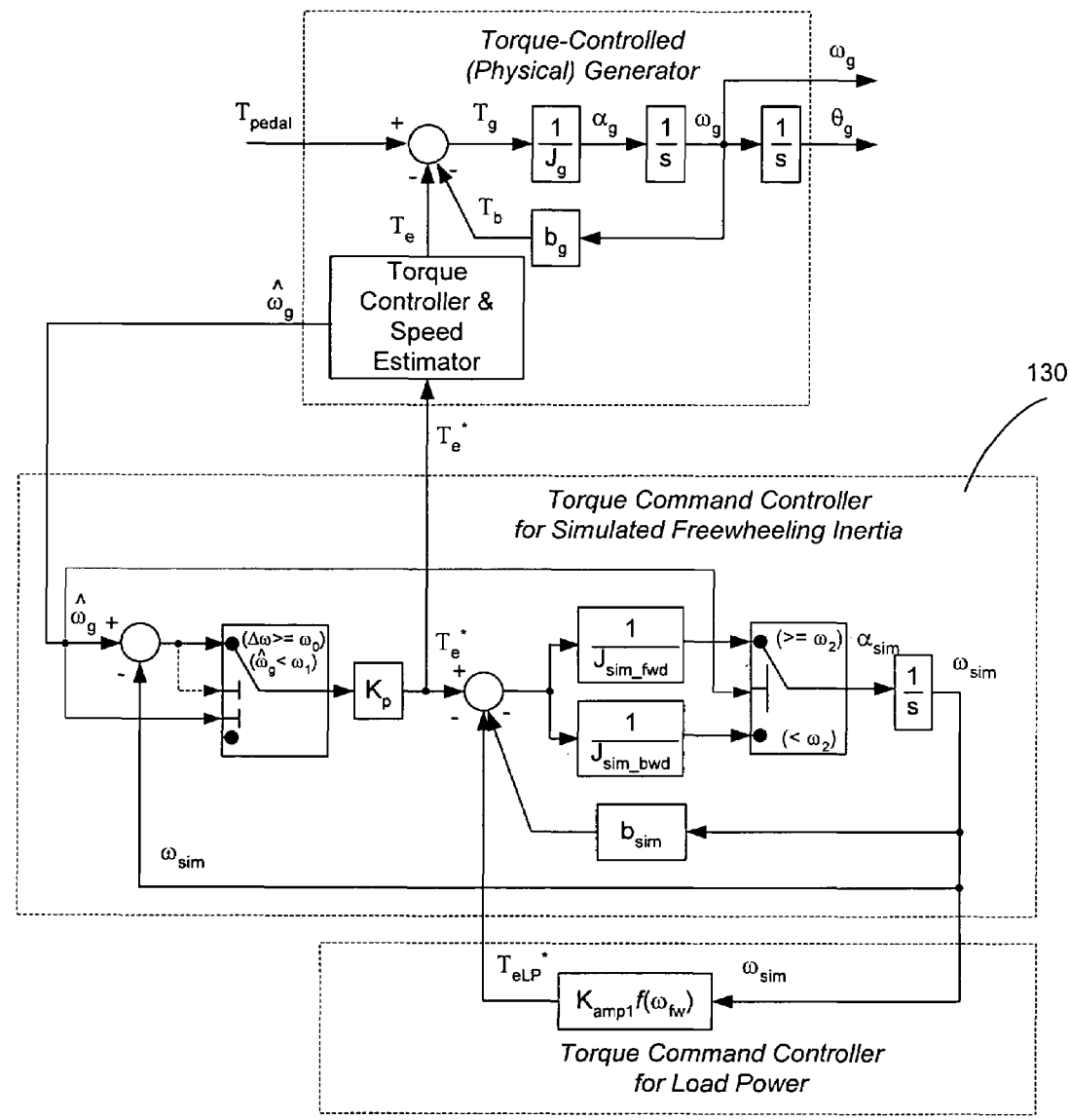

FIG. 12 is a block diagram illustrating an alternative embodiment of the controller with simulated free-wheeling inertia.

Figure 13:
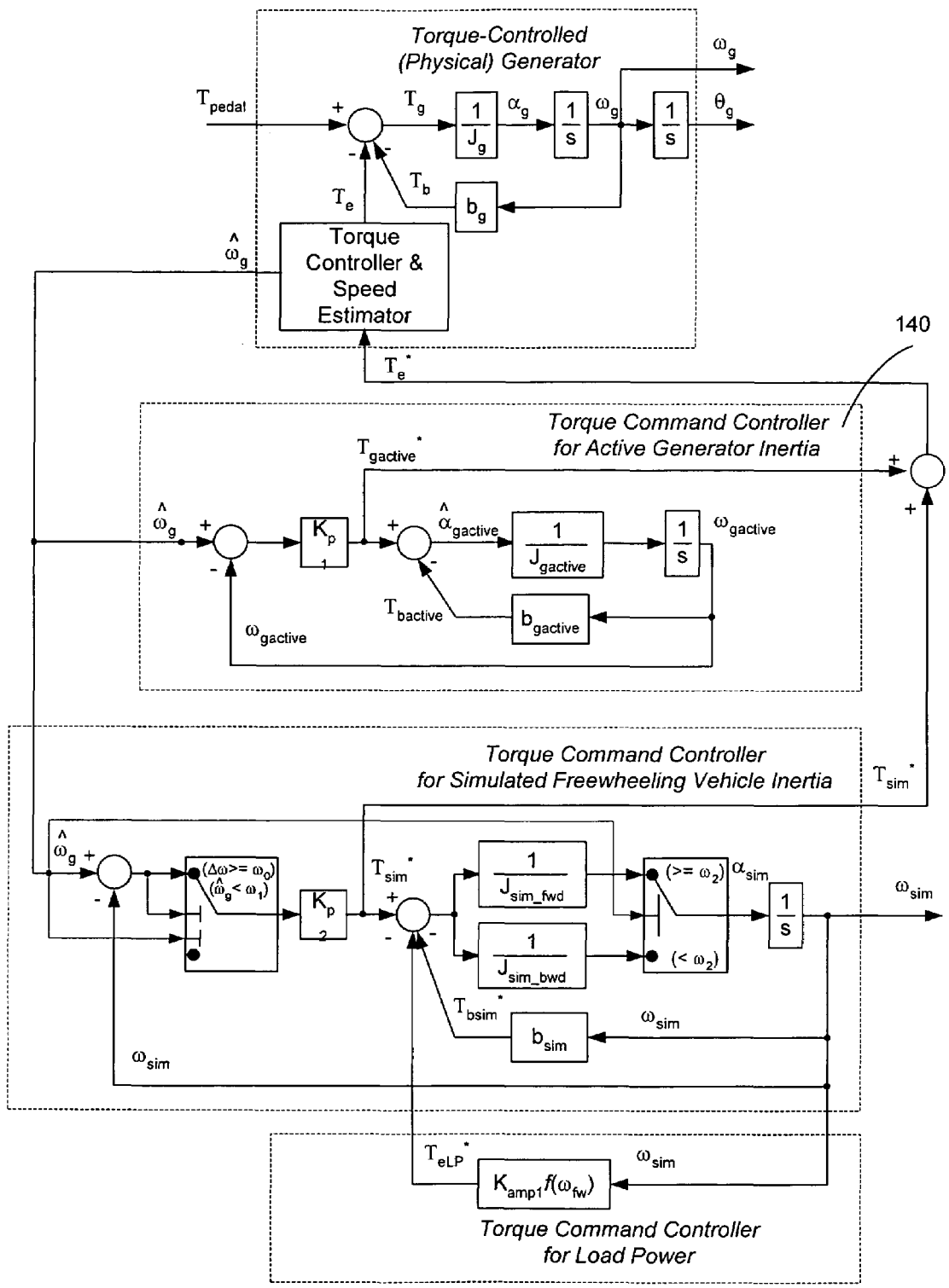

FIG. 13 is a block diagram illustrating an alternative embodiment of the controller with active generator inertia and simulated free-wheeling vehicle inertia.

Figure 14:
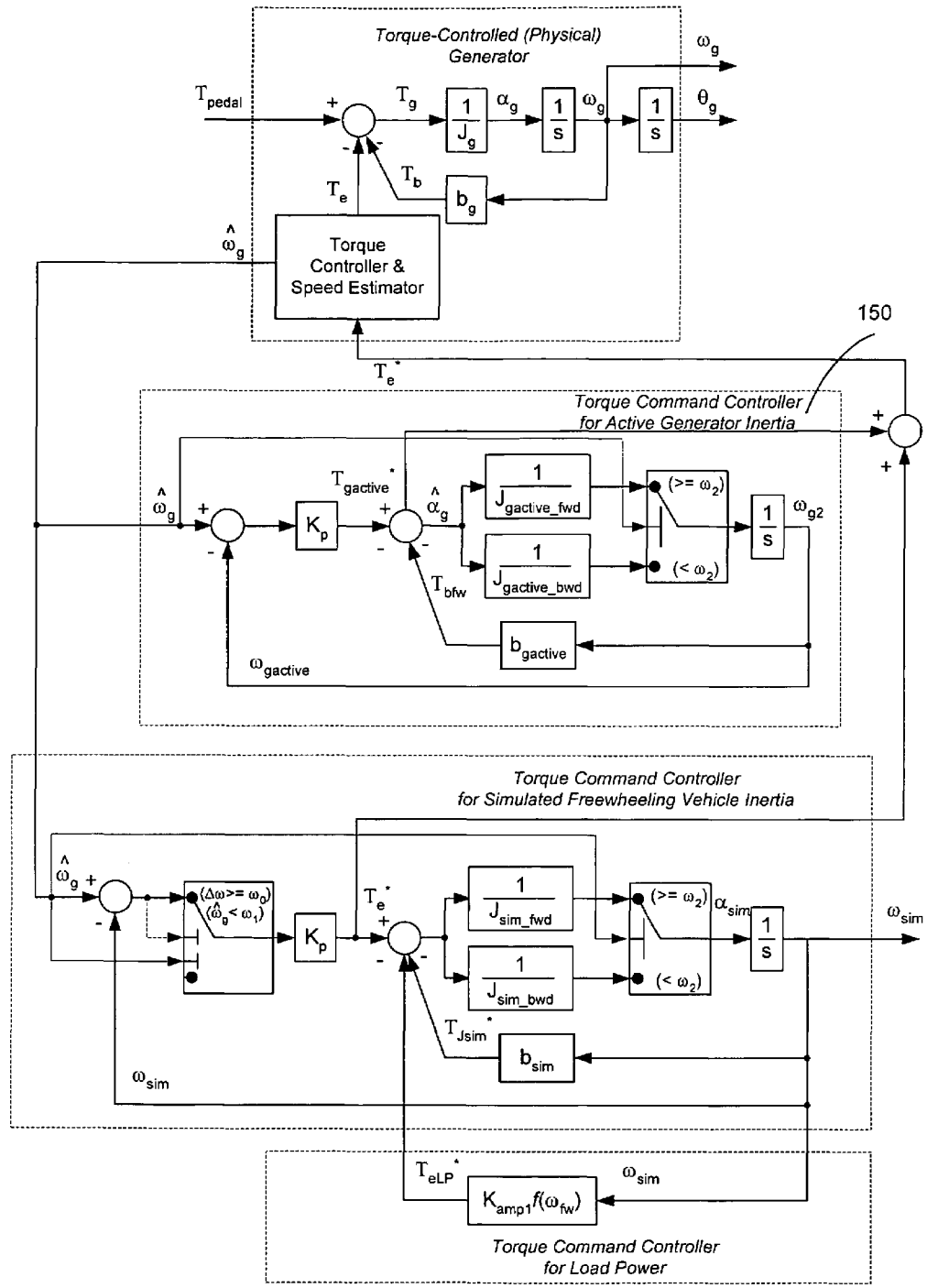

FIG. 14 is a block diagram illustrating an alternative embodiment of the controller with active directional-dependent generator inertia and simulated free-wheeling vehicle inertia.

REFERENCE NUMERALS IN DRAWINGS

1 electric watercycle watercraft utilizing the invention
2 hull of watercraft
4 strut members
5 watercraft flooring/splash guard
7 seat
22 electric pedal generator
23 foot pedals
24 pedal generator control electronics unit
26 system control electronics unit
27 status display
28 operator control unit containing status display and control electronics
29 operator control unit containing steering and optional thrust controls
32 propulsion motor control electronics
33 electric propulsion unit
34 electric propulsion motor
38 propeller
42 batteries/battery storage
43 compartment containing batteries and control electronics
44 photovoltaic solar panel
46 photovoltaic solar panel control electronics
52 shore power
54 battery charger using shore power
62 torque controlled human-power electric generator and input (pedal) mechanism
64 torque controller and speed estimator of electric generator
66 load torque command controller for load power
68 load torque command function block
70 torque command controller for active generator (and input mechanism) inertia
80 torque command controller for simulated vehicle with freewheeling inertia

| Nomenclature | |
|---|---|
| $\hat{\alpha}_g$ | estimated generator angular acceleration, rad/sec$^2$ |
| $\alpha_g$ | generator angular acceleration, rad/sec$^2$ |
| $\alpha_{sim}$ | equivalent angular acceleration of simulated vehicle, rad/sec$^2$ |
| $\theta_g$ | generator angular position, rad |
| $\omega_g$ | generator angular velocity, rad/sec |
| $\hat{\omega}_g$ | estimated or feedback value of generator angular velocity, rad/sec |
| $\omega_{sim}$ | equivalent angular velocity of simulated vehicle, rad/sec |
| $f(\omega_g)$ | function of estimated generator angular velocity, rad/sec |
| $b_g$ | viscous damping of physical generator and pedal mechanism, Nm-sec |
| $b_{gactive}$ | active (electronic) viscous damping provided by controller, Nm-sec |
| $b_{sim}$ | equivalent viscous damping of simulated vehicle, Nm-sec |
| $J_g$ | rotational inertia of physical generator and pedal mechanism, Nm-sec$^2$ |
| $J_{gactive}$ | active (electronic) rotational inertia provided by controller, Nm-sec$^2$ |
| $J_{sim}$ | equivalent rotational inertia of simulated vehicle, Nm-sec$^2$ |
| $K_{amp1}$ | generator (pedal) torque command controller gain |
| $K_{amp2}$ | propulsion motor command controller gain |
| $K_{p1}$ | proportional gain in acceleration estimator |
| $K_{p2}$ | controller gain |

-continued

Nomenclature

| | |
|---|---|
| $T_b$ | viscous damping torque of physical generator and pedal mechanism, Nm |
| $T_{bactive}$ | torque component to overcome active damping provided by controller, Nm |
| $T_e$ | electromagnetic torque created by the generator, Nm |
| $T_e^*$ | electromagnetic torque commanded to the torque-controlled generator, Nm |
| $T_g$ | torque available to accelerate generator and pedal mechanism, Nm |
| $T_{gactive}$ | torque command component combining active inertia and viscous damping, Nm |
| $T_{Jactive}$ | torque component to overcome active inertia provided by controller, Nm |
| $T_{Load}^*$ | load power component of the commanded electromagnetic torque, Nm |
| $T_{pedal}$ | torque applied to the generator via a human-powered pedal mechanism, Nm |
| $T_{Sim}^*$ | torque command component of simulated vehicle, Nm |

DETAILED DESCRIPTION

Description and Operation

Figure 1:
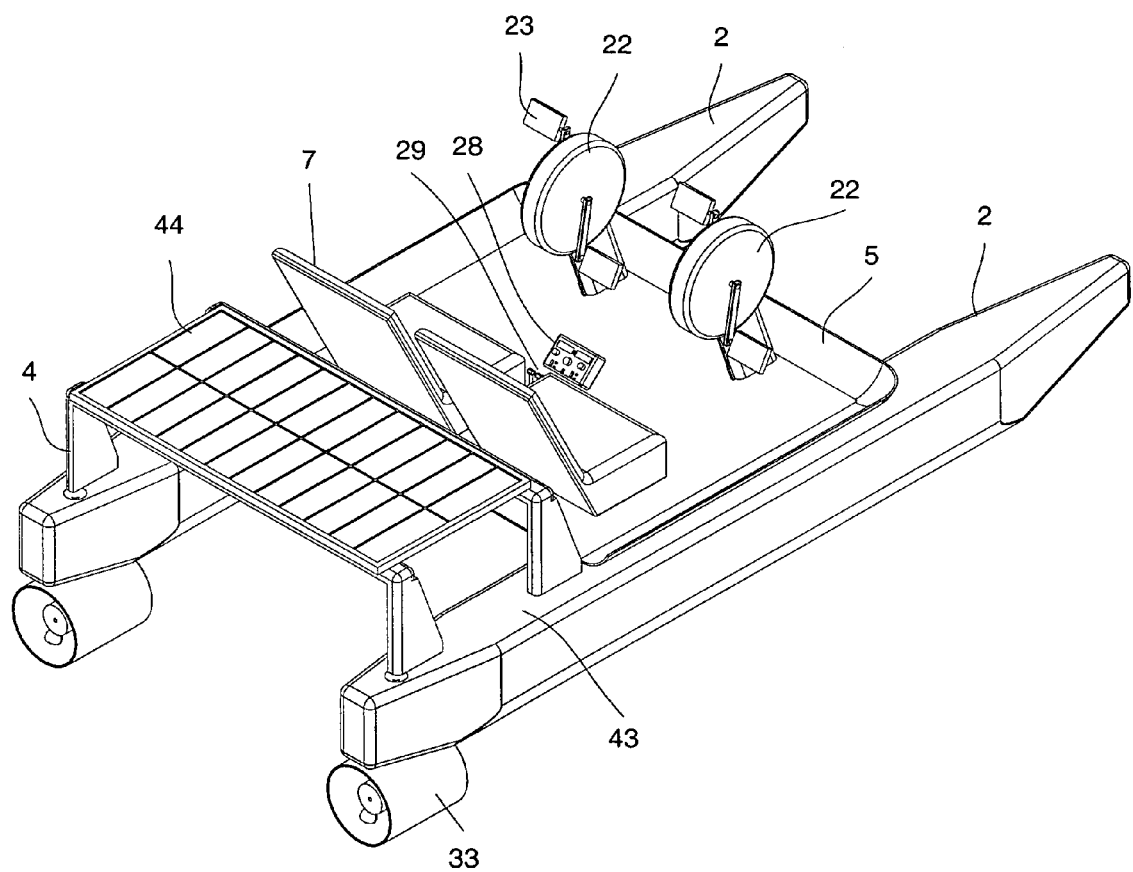
FIG. 1 is a perspective view of a twin-hulled electric watercycle designed for two operators utilizing the invention.

FIGS. 1–4 illustrate aspects of the electric watercycle disclosed in detail in U.S. Pat. No. 6,855,016 (Jansen). FIG. 1. provides a perspective view of a twin-hull embodiment of an electric watercycle designed for two operators utilizing this invention. Two propulsion electric motor units 33 provide propulsion and steering via individual control of the motor thrusts. Steering can alternatively be accomplished via one or two rudders (not shown).

A foot pedal and crank arm assembly 23, similar to that common to bicycles, connects to the shaft of an electric generator 22. The watercraft operator rotates the generator via pedaling. Mechanical (i.e, kinetic) power of the watercraft operator's pedaling action is converted to electrical power via the generator. Though foot pedals 23 are shown, the pedal generator may instead have handgrips and positioned to utilize upper body motion, rather than leg motion.

The generator 22 is preferably a direct-drive permanent-magnet (PM) three-phase AC generator. By eliminating the need for gearing or chains and sprockets, as with conventional pedal-powered watercraft, and other applications such as bicycles, the direct drive nature of the generator simplifies construction and greatly enhances reliability and reduces maintenance requirements. A PM generator is strongly preferred over other types of electric generators such as switched reluctance and induction machines to maximize efficiency and minimize weight. Compared to a geared generator operating at higher speeds, the direct drive generator is generally larger in size and mass for the same efficiency, and thus attention must be given to the generator design to minimize size, weight, and cost. The generator 22 may also be a brush or brushless DC machine. Such design skill is within the capabilities of an experienced PM motor or generator designer.

In an alternative arrangement to direct drive, a conventional pulley and a belt system are used instead to provide a "gear-ratio" increase between the pedal mechanism and the generator. The foot pedal and crank arm assembly 23 is mounted directly onto a second shaft mounted for rotation and containing a synchronous timing-belt pulley. The generator 22 shaft is similarly fitted with a synchronous timing-belt pulley, though of a smaller size than the crank arm shaft pulley. A synchronous timing-belt connects the generator and crank arm pulleys, such that the generator rotates at a substantially higher speed than the crank arm assembly. A speed ratio of at least 3:1 to 5:1 is preferred. By rotating the generator at a higher speed, the size, mass, and cost of the generator for the same efficiency can be significantly reduced.

Note that the invention, both preferred and alternative embodiments, features an all-electric drive system; i.e., there is no mechanical system linking or transmitting the human pedal power to the propulsion system. Typical watercycles use a noisy, low inertia, mechanical linkage between the pedal shaft and the propeller. The resulting pedaling characteristics tend to be uneven and not fluid, unlike pedaling a bicycle. The direct drive and geared generators provide inertia for a smoothing effect; thus making pedaling easier and more enjoyable like riding a bicycle.

Steering control is accomplished through a hand-controlled lever in the control unit 29 located near the seat. Conventional mechanical means consisting of a cable connect the lever mechanism to the rudder, or alternatively, to a swivel mounted propulsion motor. An optional second lever provides the operator with direct control of the propulsion motors to enable operation and control of the watercraft without pedaling, if desired.

An operator-control unit 28, containing system control electronics, status display, and operator-control functions, is mounted in front of the seat close to the steering control unit 29. From the control unit 28, the operator enables and disables the watercraft electric power, sets the electric generator 22 pedaling torque vs. RPM characteristics, and the power amplification level.

Figure 2:
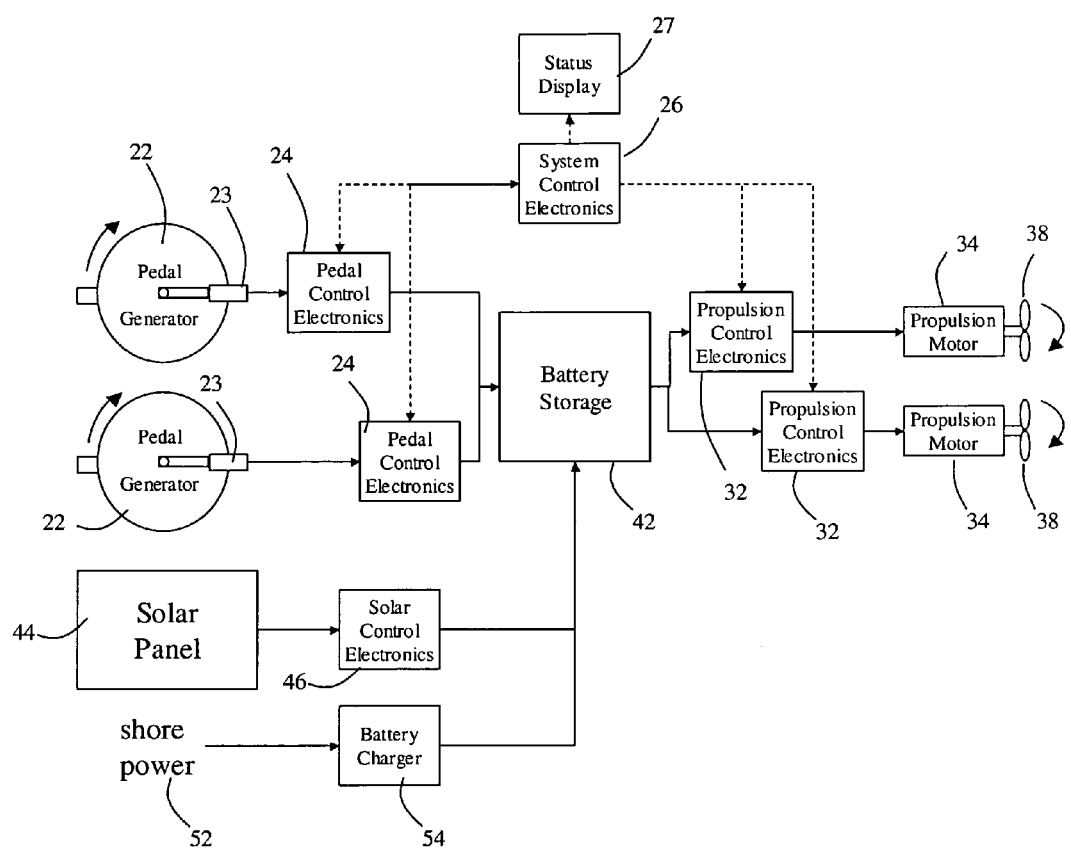
FIG. 2 is a block diagram illustration of the electrical and control system for the twin-hulled, two-operator, electric watercycle that utilizes the invention.

FIG. 2 illustrates the electrical power and control systems in a block diagram format for a two-operator watercraft with twin propulsion units. The human-powered pedal generator 22 supplies electrical power to a pedal control electronics unit 24. The pedal control electronics unit 24 regulates and conditions the power flow from the pedal generator 22 to an energy (e.g., battery) storage unit 42.

A propulsion control electronics unit 32 regulates and conditions the power flow from the energy (e.g., battery) storage unit 42 to propulsion motors 34 of propulsion motor units 33. The propulsion motors 34 are directly connected to propellers 38. A system controller 26 monitors and coordinates the power flow of the pedal generator and the propulsion motor through communication with the pedal control and the propulsion control electronic units, respectively.

In the preferred embodiment, the pedal generator 22 supplies three-phase AC electrical power to the pedal control electronics 24. Three-phase power is preferred over single-phase power because the power flow is constant and maximizes the utilization of conductors in the generator, the wires connecting to and from the generator, and the power electronic devices in the pedal control electronics unit 24. If the pedal generator is a brush or brushless DC generator, then DC electrical power is supplied to the pedal control electronics 24.

Figure 3:
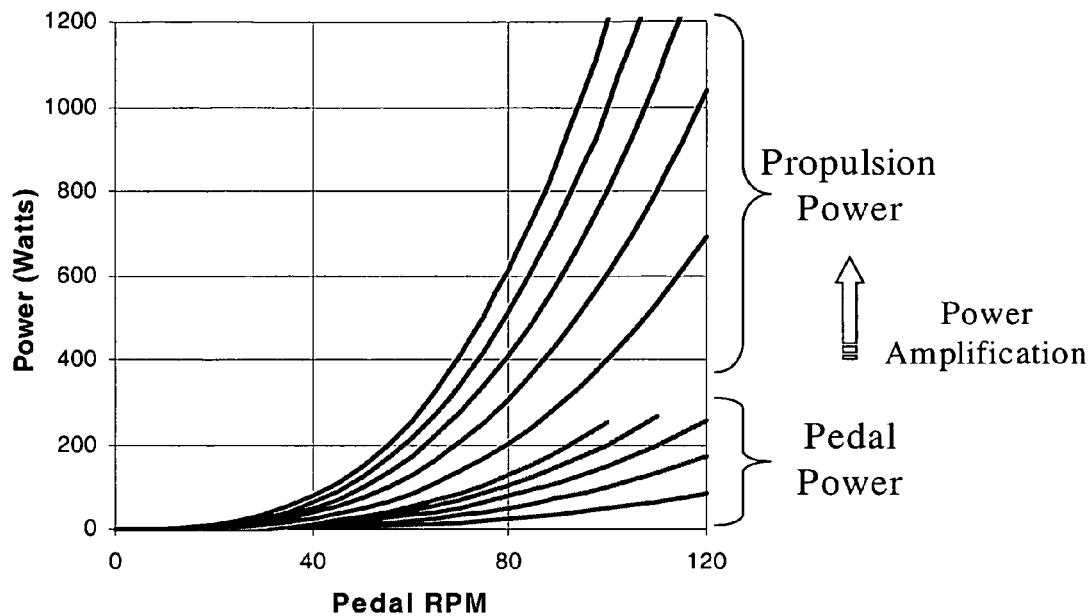
FIG. 3 is a chart illustrating the amplification of human pedal power to propulsion power provided by the electric watercycle.

FIG. 3 shows numerous curves of Power vs. Pedal RPM (cadence), illustrating both the variable electronic gearing and the variable human-power amplification provided by the electric watercycle. The curves illustrate possible operating points of both the power output of the electric generator 22 and the power output from the propulsion motor 34 as functions of the pedal cadence (RPM). Note operating points in-between the individual pedal power curves are also valid operating points. Likewise, operating points between the individual propulsion power curves are also valid operating points.

A well-conditioned cyclist is capable of continuously generating approximately 200 watts at an optimal cadence of around 90–100 RPM. The average recreational cyclist, however, would preferably generate considerably less power on a continuous basis. The electric watercycle provides the operator with effectively infinite adjustability in both gear ratio and power amplification.

As described in U.S. Pat. No. 6,855,016, a key feature of the electric watercycle is the extensive adjustability of the pedaling characteristics relating the pedal cadence and pedal force (effected through control of the generator speed and torque) to the watercraft propulsion. If desired by the operator, the pedaling characteristics can simulate boat propeller characteristics with a mechanical linkage but with nearly infinitely adjustable gear ratios. Or equivalently, the pedaling characteristics can effectively simulate a single-speed mechanical drive with nearly infinitely variable propeller sizes. A multitude of other pedaling characteristics are possible.

The propulsion power, and hence propulsion thrust and watercraft speed, is a multiple of the operator's pedal power. In the preferred embodiment, the net power amplification can range from 1 up to 100, with a maximum propulsion power of up to 1600 watts. For example, if an operator was pedaling at a cadence of 90 RPM and generating 200 watts of power, and wished to travel as quickly as possible, then the operator would set a net power amplification factor of 8 to achieve the maximum propulsion power of 1600 watts. Alternatively, if another operator desired to pedal at a cadence of 57 RPM and generate only 50 watts of power, but still travel at the same maximum speed as the other operator, the operator would set a net power amplification factor of 32. This feature enables operators of different cycling capabilities and desires (or training goals) to travel or workout together, either in separate watercraft, or in the same watercraft designed for two operators.

Figure 4:
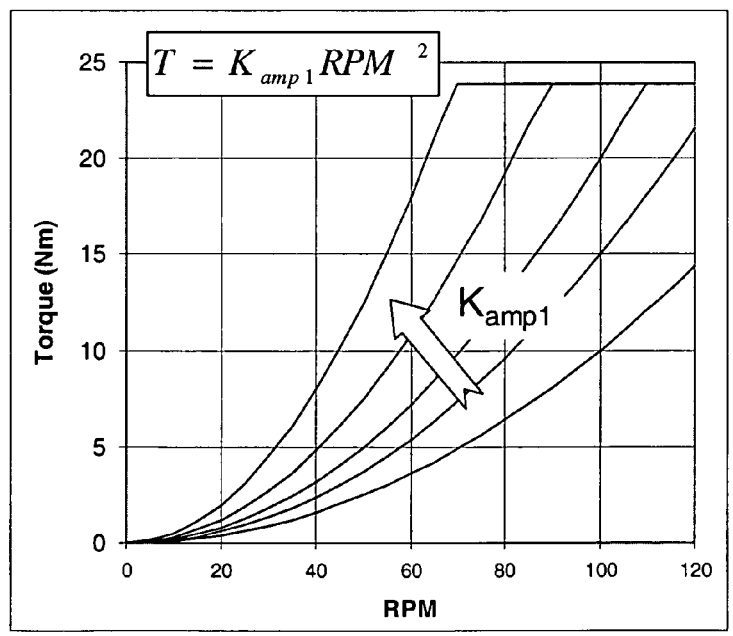
FIG. 4 is a chart illustrating the pedal generator load characteristics featuring effective variable electronic gearing provided by the pedal generator and controls with an example mapping profile proportional to RPM squared.

FIG. 4 illustrates an example pedal torque vs. pedal cadence squared load characteristic (or equivalently, torque vs. generator RPM squared) that effectively simulates a mechanical drive to a water propeller. With this mapping, the pedaling characteristics (and generator load characteristics) would mimic that of a conventional all-mechanical watercycle, with the fundamental, and important, exception being an effective, nearly-infinitely variable, gearing ratio that is set by the operator through the variable gain, $K_{amp1}$. The pedal control electronics 24 limit the maximum generator torque and power to the designed operating limits, which for this example is 24 Nm.

Figure 5:
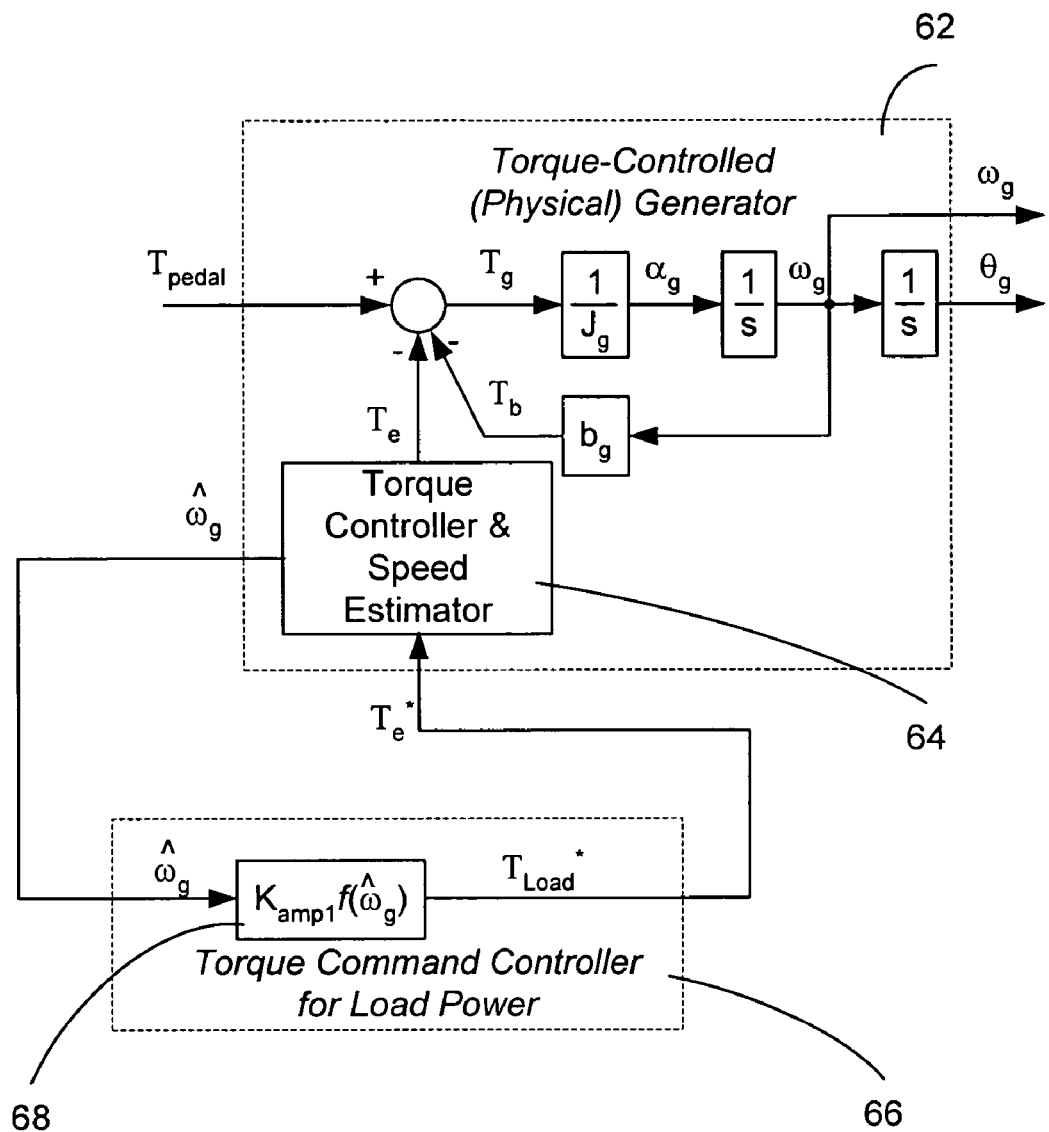
FIG. 5 is a block diagram illustrating the load controller for the pedal (human-powered) generator of the prior art.

FIG. 5 is a block diagram illustration of the human-powered (pedal) generator and load controller of the electric watercycle prior to this invention. Block 62 depicts a torque controlled generator consisting of a mechanical model of the physical pedal generator 22 combined with a torque controller and speed estimator block 64. The generator mechanical model consists of an applied torque, $T_{pedal}$, created by human power via pedaling. This applied pedal torque is counteracted by two torque components: an electromagnetic torque, $T_e$, and a viscous damping torque, $T_b$. The electromagnetic torque, $T_e$, is created by the interaction of the electromagnetic fields and electric currents within the generator. The viscous damping torque, $T_b$, is a function of the speed of the generator and pedal mechanism and is a parasitic drag torque. Other parasitic torques are also common such as stiction, friction, and windage drag torques. These torques are not illustrated here for simplicity. After subtracting the electromagnetic, viscous (and other parasitic) torques from the applied torque, the remaining torque, $T_g$, is available to accelerate the generator (and pedal mechanism). The acceleration, $\alpha_g$, is limited by the net inertia, $J_g$, which includes the generator and pedal/input mechanism. Note the physical model is applicable to both direct drive and "geared" generator/pedal mechanisms by using the appropriate effective inertia.

The torque controller and speed estimator block 64 does not represent the actual physical boundaries between the physical generator and control electronics or software, but instead is a functional block. The block 64 consists of a combination of power electronics and microprocessor control circuitry and software, as well as the electromagnetic components of the generator 22; i.e., stator winding, stator core, and permanent magnet rotor. The power electronics and microprocessor control circuitry would be implemented in the Pedal Control Electronics block 24. The input of the torque controller and speed estimator block 64 is a torque command, $T_e^*$. The block 64 contains the appropriate inner regulatory loops to ensure that the generator electromagnetic torque, $T_e$, tracks that of the commanded torque, $T_e^*$.

Numerous means of implementing the torque controller and speed estimator block 64 are well known and widely found in public literature. One often preferred implementation consists of the generator being a three-phase PM synchronous machine connected electrically to a current-regulated PWM voltage-source active rectifier containing a 3-leg MOSFET H-bridge. A field-orientation control scheme is implemented in a microcontroller, DSP, or microprocessor to provide the overall torque control. A velocity estimate of the generator is also provided by the block 64. This estimate is typically readily available from the torque control scheme as it is either input to, created by and/or utilized by the field-orientation control scheme. Both position sensorless and sensed (via encoder or resolver) control schemes are common for PM motor and generator torque control.

The loading of the generator is controlled by a Torque Command Controller for Load Power 66, which consists of torque-speed gain-function block 68. The input to the block 68 is the estimated generator (or pedal mechanism) speed from the torque control and speed estimator block 64. The output is a load torque command that is an operator-settable function of a torque amplification gain, $K_{amp1}$, and the generator velocity; i.e., $$T_{Load}^* = K_{amp1} \cdot f(\hat{\omega}_g)$$

where $f(\hat{\omega}_g)$ is an operator-settable function of the generator velocity. Note the controller may be implemented using any desired units for the velocity, $\hat{\omega}_g$, including radians/second and RPMs. Both the torque amplification gain, $K_{amp1}$, and the speed function $f(\hat{\omega}_g)$ are set by the operator. In the preferred embodiment, the speed function is implemented as a mapping function, or look-up table, in a microcontroller or DSP in the pedal control electronics unit 24. Alternatively, it can be implemented in the system control electronics unit 26. Many different mapping function options are available, a few of which were listed in the U.S. Pat. No. 6,855,016 (Jansen).

The load torque function is largely responsible for setting the amount of power that is generated by human pedaling. This power is fed to the battery storage unit 42, and ultimately to the propulsion motors 34.

FIG. 6 contains waveforms illustrating the operating characteristics of the pedal-powered generator of the electric watercycle with the Torque Command Controller for Load Power (66 as per FIG. 5) during a brief example operating period. The top two plots, (a.) and (b.) respectively, illustrate the velocity of the input pedal mechanism (i.e., cadence) (RPM$_{gen}$=30/π ω$_g$ in RPM), and the corresponding torque provided by the operator (TrqPedal=T$_{pedal}$) in Nm. The third and fourth plots, (c.) and (d.), illustrate the load torque command, (TrqLoad=T$_{Load}$*), from block 68 and the resulting electromagnetic torque command (TrqEM=T$_e$*) to the torque controlled generator. The fifth plot, (e.), illustrates the electric power created by the generator. The sixth plot, (f.), illustrates the propulsion power. The seventh plot, (g.), illustrates the resulting typical watercycle velocity.

The load torque command in FIG. 6 is set according to the function:

$$T_{Load}^* = K_{amp1} \cdot \text{sign}(\hat{\omega}_g)(\hat{\omega}_g)^2$$

where $K_{amp1}$=0.15, and $\hat{\omega}_g$ is in radians/second. Two noteworthy aspects are: firstly, the rate of rise in velocity and required torque is the same in both directions of rotation, and secondly, a significant undesirable reversing torque (101 in plot (b.)) is required to slow the pedal mechanism and generator to a stop after time 10, 20, and 30 seconds. Both are indicative of the rotational inertia of the pedal mechanism and generator. If an operator decides to casually stop pedaling, the rotational inertia will exert an uncomfortable, and potentially hazardous force, on to the operators' feet and legs (or hands if hand-operated). In some cases, the pedal mechanism could continue to rotate an entire revolution and strike the back of the operator's legs. Thus it is desired to provide a means whereby the rotational inertia can be actively modified to avoid these circumstances.

FIG. 6 further illustrates the lack of a coasting feature; i.e., the propulsion power closely tracks the speed of the generator and input pedal mechanism, such that the propulsion power becomes zero when the generator speed is zero.

FIG. 7 illustrates a new human-powered (pedal) generator and controller of FIG. 5 enhanced with a simulated (active) pedal mechanism/generator inertia and a simulated vehicle with freewheeling inertia provided by this invention. Block 70 contains a Torque Command Controller for Active Generator Inertia and damping. In the preferred embodiment, an acceleration estimator 72 provides an estimate of the generator (and input mechanism) acceleration, $\hat{\alpha}_{gactive}$, using the estimated velocity as an input. Numerous means of estimating acceleration are possible, with one means illustrated. The estimated acceleration, $\hat{\alpha}_{gactive}$, is multiplied by a desired inertia value, $J_{gactive}$, creating an active inertia torque command, $T_{Jactive}$. The inertia value may be either positive or negative. A positive inertia value will increase the effective inertia, while a negative value will decrease the effective inertia perceived by the operator. A velocity estimate obtained either directly from the block 64, or from the acceleration estimator 72 as shown, is multiplied by a desired viscous damping value, $B_{gactive}$, creating an active damping torque command, $T_{bactive}$. The active inertia and damping torque commands are combined via summation block 76, creating a net active torque command, $T_{gactive}^*$. The net active torque command, $T_{gactive}^*$ is further summed via summation block 90 with a simulated vehicle torque command, $T_{sim}^*$, that is described later. The net torque command forms the electromagnetic torque command, $T_e^*$, that is sent to the Torque-Controlled Generator block 62.

Note the simulated vehicle is preferably implemented as a rotational mechanical system to simplify the interface with the torque controlled generator system. It can also be implemented as a more physically-intuitive non-rotational system, in which case torques are replaced by forces, and rotational inertias are replaced by masses, etc.

A predominant mechanical property of the physical generator 22 and pedal/input mechanism 23 that the operator perceives while pedaling is the effective stiffness, which can be expressed as the ratio of pedal torque to angular position; i.e., $$\text{Stiffness} \equiv \frac{T_{Pedal}}{\theta_g}$$

The effective stiffness of the physical generator and pedal/input mechanism of the prior art (FIG. 5) as perceived by the operator while pedaling can be shown to be (without the Torque Command Controller for Load Power 66):

$$\frac{T_{Pedal}}{\theta_g} \cong J_g s^2 + b_g s$$

Both the inertia, $J_g$, and viscous damping, $b_g$, of the physical generator and pedal/input mechanism are seen to dictate the effective stiffness, and hence, mechanical properties. The Torque Command Controller for Load Power 66 will also impact the effective stiffness depending upon the operator-selected load function 68.

With the addition of the Torque Command Controller for Active Generator Inertia 70 of this invention in FIG. 7 (and without the Torque Command Controller for Load Power 66), the effective stiffness of the generator and input mechanism as perceived by the operator while pedaling can be shown to be:

$$\frac{T_{Pedal}}{\theta_g} \cong (J_g + J_{gactive})s^2 + (b_g + b_{gactive})s,$$

when the accuracy of the torque controller, speed estimator, and acceleration estimator are good; i.e., when $$\hat{\omega}_g \cong \omega_g, \hat{\alpha}_g \cong \alpha_g, \text{ and } T_e \cong T_e^*.$$

Thus the effective inertia and damping, and hence, effective stiffness and overall mechanical properties of the generator and pedal/input mechanism, as perceived by the operator during pedaling, can be controlled by setting controller values $J_{gactive}$ and $b_{gactive}$ as desired. Note the values are not required to be constants, but instead can be made to vary with operating point or time; e.g., the active inertia can be changed as a function of the direction of rotation; i.e., $$J_{gactive} = J_{gactive\_fwd} \text{ when } \hat{\omega}_g \geq 0$$

$$J_{gactive} = J_{gactive\_bwd} \text{ when } \hat{\omega}_g < 0$$

where $J_{gactive\_fwd} \neq J_{gactive\_bwd}$.

Note the acceleration estimator 72 can be shown to provide an estimate of the generator acceleration according to the following transfer function:

$$\hat{\alpha}_{gactive} = \frac{K_{p1}}{s + K_{p1}}(s\hat{\omega}_g)$$

which shows that the estimator provides a filtered estimate of the acceleration.

Block 80 contains a Torque Command Controller for a Simulated Vehicle with a Freewheeling Inertia, coupled with the Torque Command Controller for Load Power 66. Block 82 simulates a freewheeling clutch mechanism similar to that in bicycles. When the velocity of the generator is greater than or equal to that of the simulated vehicle, $\omega_{sim}$, the simulated clutch mechanism is engaged (block 84). A torque command, $T_{sim}^*$, is then created that is proportional to the difference in speed; i.e., $$T_{sim}^* = K_{p2}(\hat{\omega}_g - \omega_{sim}) \text{ when } \hat{\omega}_g - \omega_{sim} \geq \omega_0$$

$$T_{sim}^* = 0 \text{ when } \hat{\omega}_g - \omega_{sim} < \omega_0$$

The simulated vehicle is further characterized by a simulated rotational inertia, $J_{sim}$, and viscous damping, $b_{sim}$. Additional damping terms may also be added.

The Torque Command Controller for Load Power 66 utilizes the simulated vehicle velocity, $\omega_{sim}$, as input to the load torque function rather than the generator (or input/pedal mechanism) velocity as in the prior art. The loading characteristics of a bicycle can be thus captured by this change to the function; e.g., traveling up or down simulated hills, as well as the basic function of setting the amount of humanpower that is generated and ultimately supplied to the propulsion motors.

The torque command, $T_{sim}^*$, that is created and regulated within block 82 via gain $K_{p2}$ attempts to force the simulated vehicle velocity, $\omega_{sim}$, to track that generator velocity, $\omega_g$, (i.e., engage the clutch mechanism) when the generator velocity is greater than or equal to the simulated vehicle velocity. When the generator velocity is less than the simulated vehicle velocity, the simulated clutch is disengaged, and the generator/input pedal mechanism and simulated vehicle are allowed to spin independent of each other; i.e., freewheel. This functionality enables an operator to reduce cadence, or stop pedaling all together, without bringing the simulated vehicle to a sudden reduction in speed or stoppage, similar to the operation of a bicycle.

The functional similarity to a bicycle is taken yet another step by utilizing the simulated vehicle velocity, $\omega_{sim}$, as a command input to the propulsion control electronics. In the electric watercycle of U.S. Pat. No. 6,855,016 (Jansen), the voltage applied to the propulsion motors is approximately proportional to the speed of the pedal generator(s); i.e., $$V_{motor}^* \propto K_{amp2} \hat{\omega}_{gen}$$

(This is assuming a brushed or brushless DC propulsion motor. For an AC propulsion motor, both the voltage and frequency would be roughly proportional to the speed of the pedal generator.) Thus when an operator stopped pedaling, the propulsion motors would similarly stop rotating, and the watercycle would come to a relatively quick stop, depending upon the inherent drag force imparted by the water on the watercycle.

A feature of this invention is that the propulsion motor voltage (and/or any other command to the propulsion units) is instead made a function of the simulated vehicle velocity; i.e., $$V_{motor}^* \propto K_{amp2} \omega_{sim}$$

The simulated vehicle inertia is set to a large value relative to the generator/input mechanism inertia such that the simulated vehicle can coast for an increased, though user controlled, period of time after the operator reduces pedaling speed or stops pedaling altogether. During this time, the actual watercraft would continue to travel as if also coasting without energy put forth by the operator(s) pedaling, although the propulsion motor would remain energized and providing propulsion.

For safety purposes, the simulated vehicle velocity is forced to track the estimated generator velocity when the generator velocity is either negative, or below a certain threshold value. This functionality is not illustrated in the block diagram in FIG. 7, but is simply implemented in software via the additional controller statement:

If $(\hat{\omega}_g \leq \omega_0)$ then $\omega_{sim} \equiv \hat{\omega}_g$

Thus the operator can quickly stop the simulated coasting action of the watercycle by simply pedaling in reverse, or pedaling slower than a desired threshold velocity, $\omega_0$ (which is typically set at a slightly negative value; e.g., −5 RPM). Furthermore, to enable reversing of the watercycle, and also enable even faster stopping action, the simulated vehicle velocity continues to track the generator velocity when pedaling in reverse, thereby imparting a negative command to the propulsion control electronics to reverse the propulsion motor(s).

For watercycles designed for two operators, each generator and pedal control electronics unit preferably contains its own simulated vehicle. An average simulated velocity is then used as the command to the propulsion units; i.e., $$V_{motor}^* \propto K_{amp2} \omega_{sim\_ave}, \text{ where } \omega_{sim\_ave} = \omega_{sim1} + \omega_{sim2}$$

FIG. 8 illustrates the control signals passing between the Pedal Control Electronics unit 24 and the torque command controllers of this invention for a dual-operator, dual propulsion electric watercycle. Each operator has his/her own pedal generator and associated Pedal Control Electronics units 24, as well as torque command controller. FIG. 8 further illustrates the passing of the simulated vehicle speed, $\omega_{sim1}$ and $\omega_{sim2}$, from each of the two torque command controllers to a Propulsion Command Controller 201, which in turn sends the appropriate voltage (or speed, or torque, or current, or frequency) commands, $N_1^*$ and $N_2^*$, to the two Propulsion Control Electronics and Motor units 32 and 34. In the preferred embodiment, the Propulsion Command Controller 201 is implemented in a microcontroller as part of the System Control Electronics unit 26. The torque command controller blocks, 66, 70, and 80, of this invention can be implemented in the same microcontroller in the System Control Electronics unit 26. Alternatively, the torque command controller blocks can be implemented in separate microcontrollers for each operator as part of each of the Pedal Control Electronics units 24.

Figure 9A:
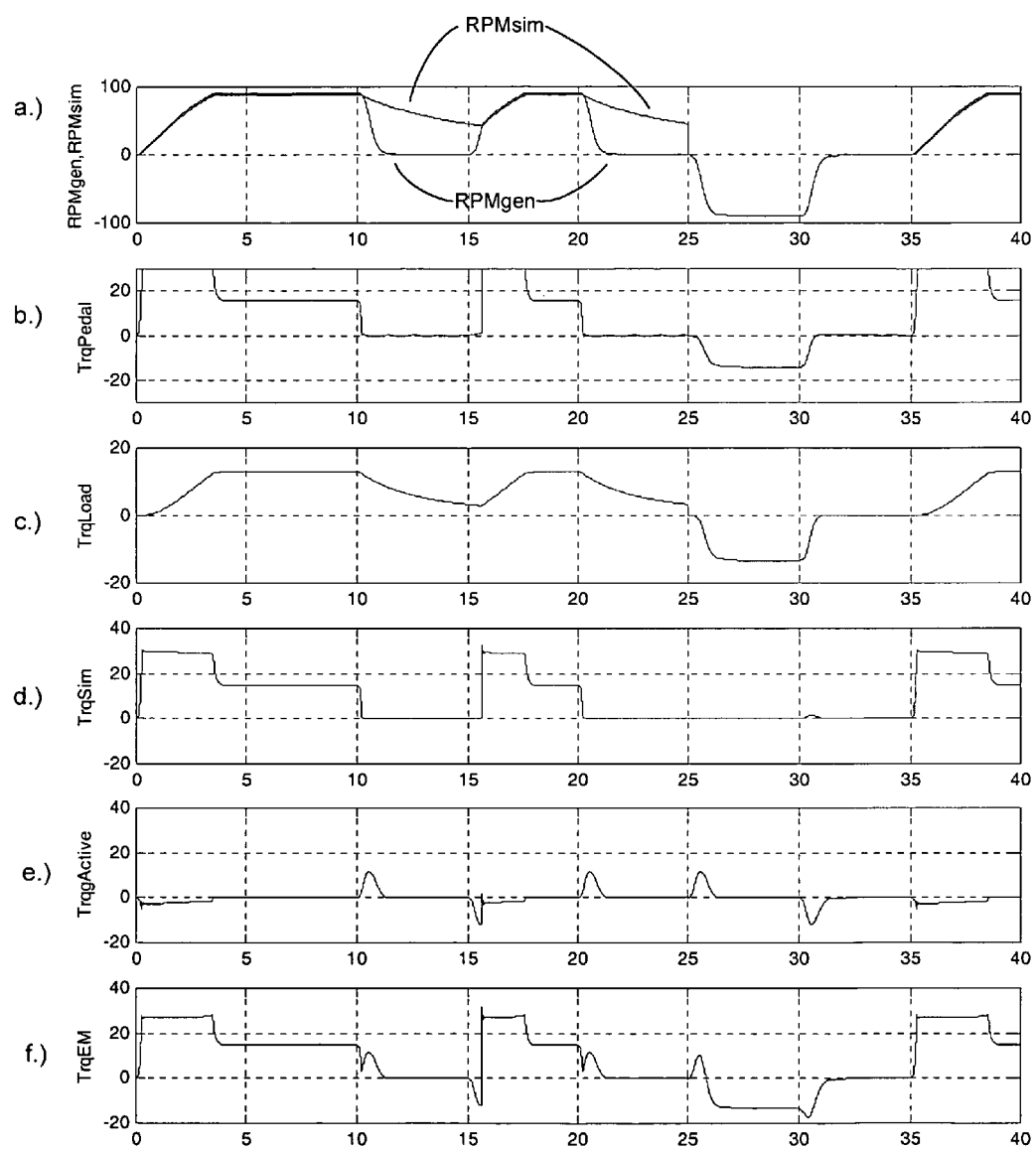
Figure 9B:
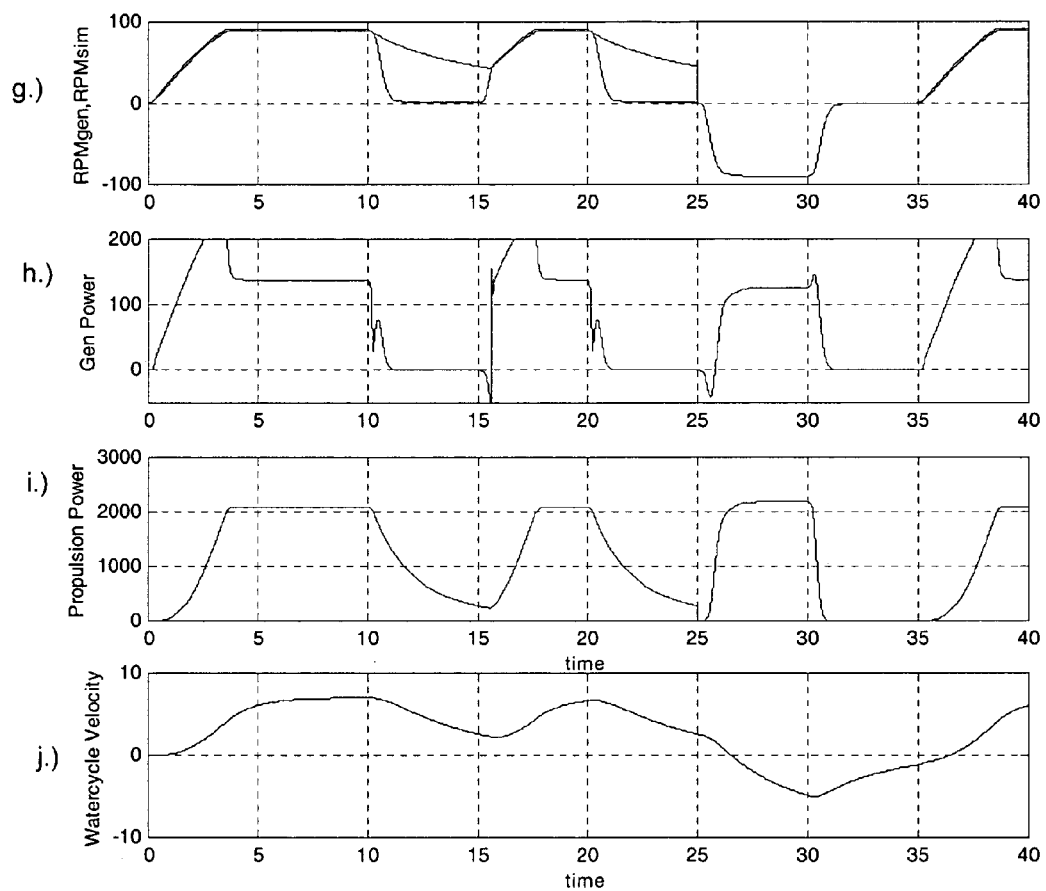

FIGS. 9A and 9B contain waveforms illustrating the operating characteristics of the pedal-powered generator of the electric watercycle with the preferred embodiment of the invention (FIG. 7) during a brief example operating period. The top plot (a.) in FIG. 9A contains two waveforms. The top waveform of plot (a.) illustrates the velocity of the simulated vehicle, $RPM_{sim}$, from block 80, and the bottom waveform illustrates the velocity of the input pedal mechanism, $RPM_{gen}$, (i.e., cadence), where $$RPM_{sim} = \frac{60}{2\pi}\omega_{sim} \text{ and } RPM_{gen} = \frac{60}{2\pi}\omega_g.$$

Because of the simulated free-wheeling clutch mechanism, the $RPM_{sim}$ and $RPM_{gen}$ velocities track each other during positive acceleration and at steady state loaded conditions; e.g., from time 0–10 seconds, and 30–40 seconds. From time 10–15 seconds, the operator stops pedaling bringing the generator and input pedal mechanism down to a standstill. Meanwhile, the simulated vehicle is freewheeling (the clutch is disengaged) and only slowly decays in speed. Since the simulated vehicle velocity, $RPM_{sim}$ (or $\omega_{sim}$), is used as the command to the electric watercycle propulsion system, the watercycle speed will similarly only slowly decay. (Unlike in the prior art, in which case the watercycle would slow down drastically, if not stop.). The rate of speed decay of the simulated vehicle (and the corresponding physical electric watercycle) is dictated by the simulated inertia value chosen, $J_{sim}$, the simulated damping value chosen, $b_{sim}$, and the amount of load torque, $T_{Load}$.

The second plot in FIG. 9A, plot (b.), illustrates the pedal torque required by the operator to create the speed profile of plot (a.). The third plot, plot (c.), illustrates the load torque command, $T_{load}*$, from the block 66. The fourth plot (d.) illustrates the torque command, $T_{sim}*$, generated by the simulated vehicle block 80, which includes the load torque command from block 66 and illustrated in plot c. The fifth plot (e.) illustrates the torque command $T_{gactive}*$ from the active generator inertia block 70. The sixth plot (f.) illustrates the electromagnetic torque, Te, which is the sum of all the torque commands.

The seventh plot, (g.), in FIG. 9B again illustrates the velocity of the simulated vehicle, $RPM_{sim}$, from block 80, and the velocity of the input pedal mechanism, $RPM_{gen}$. The eighth plot, (h.), illustrates the electrical power created by the generator. The ninth plot, (i.), illustrates the propulsion power resulting from using the simulated vehicle velocity signal for commanding the propulsion motor speed. Finally, the tenth plot, (j.), illustrates the resulting typical watercycle velocity.

The value of the simulated vehicle inertia, $J_{sim}$, is chosen to be large, such that additional pedal torque is required to accelerate the generator (and the simulated vehicle). The pedal torque supplied by the operator is limited to the physical abilities and desires of the operator. The torque capability of the generator and power electronics are also limited by design. In this example, the pedal torque is assumed to be limited to 30 Nm, and a simulated inertia value of 8.5 kg-m2 is chosen. The initial acceleration period thus takes 3 seconds at this maximum pedal torque, compared to approximately 1 second at 20 Nm pedal torque for the prior art system in FIG. 6. Thus demonstrating the control of the simulated inertia. The electromagnetic torque is similarly at its maximum value of 30 Nm during this acceleration period. The power created by the generator is seen to peak at 200 Watts, compared to only 125 Watts of the prior art in FIG. 6.

From time 10 to 15 seconds, the operator in the example has stopped pedaling. The speed of the input pedal mechanism (and generator) quickly comes down to zero, but without the large undesirable negative (i.e., reversing) pedal torques 101 required by the prior art (shown in FIG. 6 waveform). This is because the value of the active inertia, $J_{gactive}$, in block 74 was chosen to be equal to −80% of the physical input mechanism and generator inertia; thereby reducing the net effective inertia to 20% of the physical inertia. During this same time period, the speed of the simulated vehicle is seen to only slowly decay. This is because the value of $J_{sim}$ is large, and the simulated clutch allows the simulated vehicle to freewheel, much like that of a bicycle. Because the simulated vehicle velocity is also used as an input to the propulsion command controller, rather than the physical generator velocity, the watercycle velocity only decays slightly, thus simulating the coasting characteristic of bicycles. Note that the propulsion power (plot i.) is not zero during "coasting" however, unlike with a bicycle.

At time 25 seconds, the operator pedals in reverse, thereby engaging the override controls that constrain the simulated vehicle velocity to be equal to the generator velocity. The coasting action of the watercycle is quickly stopped, and the watercycle quickly comes to a stop, and even moves in the reverse direction.

The values for the active and simulated inertias, $J_{gactive}$ and $J_{sim}$, as well as the damping values, can also be allowed to vary as a function of speed, time, or any other parameter or operating point. By increasing the value of $J_{sim}$ and decreasing the damping value $B_{sim}$, and reducing the load torque, $T_{Load}$, coasting downhill can be simulated, and "experienced" by the operator(s).

FIGS. 10–14 illustrate alternative, less preferred, embodiments of the invention.

FIG. 10 is a block diagram illustrating an alternative embodiment of the invention. A Torque Command Controller for Active Generator Inertia block 110 features two values for the active inertia. When the generator is rotating in the forward direction (or at a velocity>=$\omega_2$), an active inertia value of $J_{gactive\_fwd}$ is used. When rotating backwards (or at a velocity<$\omega_2$), the value of $J_{gactive\_bwd}$ is used. With values chosen such that $J_{gactive\_fwd}$ is large, and $J_{gactive\_bwd}$ is small or negative, the controller can mimic a bicycle clutch mechanism and larger forward inertia, but without the coasting feature.

FIG. 11 is a block diagram illustrating an alternative embodiment of the controller illustrated in FIG. 10 with simulated inertia. In this case, an acceleration estimator (e.g., 111 in FIG. 10) is not utilized in the Torque Command Controller for Active Generator Inertia block 120.

FIG. 12 is a block diagram illustrating another alternative embodiment of the invention. A Torque Command Controller for Simulated Freewheeling Inertia block 130 features two values for the simulated inertia. When the generator is rotating in the forward direction (or at a velocity>=$\omega_2$), an simulated inertia value of $J_{sim\_fwd}$ is used. When rotating backwards (or at a velocity<$\omega_2$), the value of $J_{sim\_bwd}$ is used. With values chosen such that $J_{sim\_fwd}$ is large, and $J_{sim\_bwd}$ is small or negative, the controller can mimic a bicycle mechanism complete with the coasting feature. Note functions of the Torque Command Controller for Active Generator Inertia block (70 in FIG. 7) are partly captured within the Simulated Freewheeling Inertia block 130 by augmenting the simulated clutch (switch) to also latch when the estimated generator velocity is less than a threshold value, $\omega_1$ (typically around 0).

FIGS. 13 and 14 add Torque Command Controller for Active Generator Inertia blocks 140 and 150, respectively, to the system in FIG. 12 to provide further control of the effective generator and input mechanism inertia and damping in both forward and backward rotating directions. The active generator inertia in the embodiment of FIG. 13 (block 140) is of a single value, whereas the active generator inertia in the embodiment of FIG. 14 (block 150) is one of two values that is selected based upon the generator velocity.

Conclusion, Ramifications, and Scope

While the detailed drawings, specific examples, and formulations given describe exemplary embodiments, they serve the purpose of illustration only. The configurations shown and described may differ depending upon on the chosen application and controller and propulsion motor type and implement method. This invention is equally applicable to alternative forms of electric watercycles, including electric watercycles designed for one operator and/or single-hulled watercycles. The invention is also applicable to stationary exercise equipment, such as stationary bicycles, and human-powered electric power generation means.

What is claimed is:

1. A generation system comprising:
   a.) an input means adapted to be powered by a human operator for creation of mechanical energy,
   b.) an electrical generation means connected to the input means and adapted to convert the mechanical energy into electric energy
   c.) a control means connected to the electrical generation means and adapted to control the load on the electrical generation means, and
   d.) the control means further configured to modify the effective inertia of the generation system as perceived by the human operator from the input means.

2. The generation system of claim 1, wherein the electrical generation means is a rotating electrical generator and the control means is configured to modify the effective rotational inertia as perceived by the human operator.

3. The generation system of claim 1, wherein the control means is configured to decrease the effective net inertia of the input and the electrical generation means.

4. The generation system of claim 2, wherein the control means is configured to increase the effective rotational inertia when the electrical generator is rotating in a forward direction.

5. The generation system of claim 2, wherein the control means is configured to decrease the effective rotational inertia when the electrical generator is rotating in a backward direction.

6. The generation system of claim 1, further configured to be used in an electric watercycle.

7. The generation system of claim 1, wherein the control means is further configured to simulate a vehicle.

8. The generation system of claim 7, wherein the control means is further configured such that the simulated vehicle has a freewheeling clutch mechanism.

9. The generation system of claim 8, wherein the control means is further configured such that the simulated vehicle with freewheeling clutch mechanism has an effective inertia greater than the effective rotational inertia of the generation system.

10. The generation system of claim 7, wherein the control means is further configured such that the simulated vehicle produces a simulated velocity that is used to create a propulsion command.

11. The generation system of claims 6 and 9, wherein the control means is further configured such that the simulated vehicle produces a simulated velocity that is used to create a propulsion command to thereby create a coasting effect when the operator(s) reduces pedaling effort.

12. The generation system of claim 1, wherein the control means is further configured to modify the effective damping of the generation system as perceived by the human operator from the input means.

13. A vehicle comprising:
   a.) an input means adapted to be powered by a human operator for creation of mechanical energy,
   b.) an electrical generation means connected to the input means and adapted to convert the mechanical energy into electric energy,
   c.) an energy storage means connected to the generator and adapted to store electric energy,
   d.) at least one output means connected to the energy storage means and electrical generation means and adapted to provide locomotion to the vehicle,
   e.) a control means connected to the electrical generation means and adapted to control the load on the electrical generation means, and
   f.) the control means further configured to modify the effective inertia of the input and electrical generation means as perceived by the human operator.

14. The vehicle of claim 13, wherein the control means is further configured to simulate a vehicle operation.

15. The vehicle of claim 13, wherein the control means is further configured to simulate a vehicle operation containing a freewheeling clutch mechanism.

16. The vehicle of claim 13, wherein the control means is further configured to simulate a vehicle operation whereby a velocity signal from the simulated vehicle operation provides a propulsion command signal to the vehicle output means.

17. A vehicle comprising:
   a.) an input means adapted to be powered by a human operator for creation of mechanical energy,
   b.) an electrical generation means connected to the input means and adapted to convert the mechanical energy into electric energy,
   c.) an energy storage means connected to the generator and adapted to store electric energy,
   d.) at least one output means connected to the energy storage means and electrical generation means and adapted to provide locomotion to the vehicle,
   e.) a control means connected to the electrical generation means and adapted to control the load on the electrical generation means, and
   f.) the control means further configured to simulate a vehicle operation.

18. The vehicle of claim 17, wherein the control means is further configured such that the simulated vehicle operation simulates the freewheeling clutch mechanism and coasting action of a bicycle.

19. The vehicle of claim 17, wherein the control means is further configured to modify the effective mechanical properties of the input and electrical generation means as perceived by the human operator.

20. The vehicle of claim 17, wherein the control means is further configured such that a velocity signal from the simulated vehicle operation provides a propulsion command signal to the vehicle output means.

* * * * *